US007882235B2

(12) United States Patent
Yumoto et al.

(10) Patent No.: US 7,882,235 B2
(45) Date of Patent: Feb. 1, 2011

(54) SESSION CONTROL APPARATUS, SOFTWARE APPLIED TO SESSION CONTROL APPARATUS, COMMUNICATION CONTROL METHOD, AND NETWORK SYSTEM

(75) Inventors: Kazuma Yumoto, Hachioji (JP); Satoshi Kiyoto, Fujisawa (JP); Hitomi Nakamura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1083 days.

(21) Appl. No.: 10/762,512

(22) Filed: Jan. 23, 2004

(65) Prior Publication Data
US 2004/0267939 A1    Dec. 30, 2004

(30) Foreign Application Priority Data
Jun. 30, 2003    (JP)    ............................. 2003-186102

(51) Int. Cl.
*G06F 15/16*    (2006.01)
*G06F 15/173*    (2006.01)

(52) U.S. Cl. .................. 709/227; 709/223; 709/224; 709/228

(58) Field of Classification Search ................. 709/224, 709/225, 227, 228
See application file for complete search history.

(56) References Cited

U.S. PATENT DOCUMENTS

| | | | |
|---|---|---|---|
| 6,301,609 B1 * | 10/2001 | Aravamudan et al. | 709/207 |
| 6,421,536 B1 | 7/2002 | Uranaka et al. | |
| 6,895,554 B2 * | 5/2005 | Endress et al. | 715/255 |
| 7,522,591 B2 * | 4/2009 | Kiyoto et al. | 370/389 |
| 2002/0098840 A1 * | 7/2002 | Hanson et al. | 455/435 |
| 2002/0141354 A1 | 10/2002 | Niiya et al. | |
| 2003/0154251 A1 * | 8/2003 | Manabe et al. | 709/204 |
| 2004/0139195 A1 * | 7/2004 | Feather et al. | 709/224 |
| 2004/0205175 A1 * | 10/2004 | Kammerer | 709/223 |

FOREIGN PATENT DOCUMENTS

| | | |
|---|---|---|
| JP | 2000-174925 | 6/2000 |
| JP | 2002-141954 | 11/2000 |
| JP | 2002-152224 | 11/2000 |
| JP | 2002-359690 | 12/2002 |

OTHER PUBLICATIONS

Handley et al., SIP: Session Initiation Protocol, published on Mar. 1999 by the IETF.*
M. Day et al., "A Model for Presence and Instant Messaging", Internet Engineering Task Force, RFC 2778, Feb. 2000, pp. 1-12.
A.B. Roach, "Session Initiation Protocol (SIP)—Specified Event Notification", Internet Engineering Task Force, RFC 3265, Jun. 2002, pp. 1-27.
Office Action from Japanese Patent Office for Japanese Patent Application No. 2008-148723, mailed Jul. 27, 2010.

* cited by examiner

*Primary Examiner*—Nathan Flynn
*Assistant Examiner*—Jeong S Park
(74) *Attorney, Agent, or Firm*—Stites & Harbison, PLLC; Juan Carlos A. Marquez, Esq.

(57) ABSTRACT

A network system includes a session control server and a presence server. The session control server includes a presence information update unit that is started when the status changes and notifies the presence server of the changed status. The presence server includes a presence information control unit that controls the consistency of the notified update information.

49 Claims, 12 Drawing Sheets

FIG.12

| START-LINE | REGISTER sip : pres.xyz.com SIP/2.0 | ~300 |
|---|---|---|
| HEADER | Via : xxx<br>From : sip : proxy@xyz.com ; tag=xxx<br>To : sip : user-a@xyz.com<br>Call-ID : 789@proxy.xyz.com<br>CSeq : 123 REGISTER<br>Expires : 3600<br>Content-Type : application/xxx<br>Content-Length : xxx | ~310 |
| EMPTY LINE | | ~320 |
| BODY | `<?xml version="1.0" encoding="UTF-8"?>`<br>`<xxxx : presence`<br>`    xmlns : xxxx="···"`<br>`    :`<br>`    entity="sip : user-a@xyz.com">`<br>`  <xxxx : tuple id="sip : user-a@host-a.xyz.com">`<br>`    <xxxx : status>`<br>`      <local : phoneStatus>`<br>`        open`<br>`      </local : phoneStatus>`<br>`    </xxxx : status>`<br>`    <xxxx : contact>`<br>`      sip : user-a@host-a.xyz.com`<br>`    </xxxx : contact>`<br>`  </xxxx : tuple>`<br>`</xxxx : presence>` | ~330 |

SESSION CONTROL APPARATUS, SOFTWARE APPLIED TO SESSION CONTROL APPARATUS, COMMUNICATION CONTROL METHOD, AND NETWORK SYSTEM

BACKGROUND OF THE INVENTION

The present invention relates to a presence information management system that manages status information on a user and a terminal, and more particularly to a technology that allows an apparatus, responsible for session control and management, to notify a change in the status of a user or a terminal on behalf of the user or the terminal.

The concept of "presence" has been discussed mainly by the IETF's (Internet Engineering Task Force) impp (Instant Messaging and Presence Protocol) working group (for example, see RFC 2778), and a presence information receiving/sending method using a communication protocol, named SIP (Session Initiation Protocol), was proposed (for example, see RFC 3265). In addition, development of a presence server dedicated to the management of information describing such a presence is now under way.

On the other hand, the concept of presence is embodied in the so-called IM (Instant Message), so that, immediately when a user to whom a message is sent goes on-line, the message is notified to that user.

Although not equivalent to "presence" that is a generalized concept, an information notification service providing some aspect of presence information has been used even on a conventional analog telephone. An example is a notification service that sends an answer-phone message to the calling side when the recipient is absent.

FIG. 9 shows an example of a conventional system using presence information. In the system using presence information shown in FIG. 9, a terminal 1 has the presence information update function 200. The terminal 1 uses this function to send a packet, which includes presence information, to a session control server 3 that has a packet relay function 210 and, via the session control server 3, delivers the packet to a presence server 7 that has a presence information management function 220.

FIG. 10 shows another example of a conventional system using presence information. In this example, presence information is notified and updated directly between a terminal 1c and a terminal 1d without using a presence server. However, the terminal, in both FIG. 9 and FIG. 10, requires a function to process presence information. Especially, in the mode shown in FIG. 10, the terminal requires not only the presence information update function 200 but also the function which receives and manages presence information 250 that also has the display function.

In a conventional system using presence information such as the IM service, a program on the client side must have an ability to notify a change in the presence status. The same holds true for a PSTN (Public Switch Telephone Network) and, for a service that notifies a user's answer-phone message to a caller, the telephone user must set the answer-phone message in the telephone. That is, the telephone requires a function that notifies presence information to the caller.

It is an object of the present invention to enable a terminal user, who uses a terminal with no function to notify and update presence information, to receive a service that uses presence information.

SUMMARY OF THE INVENTION

To achieve the above object, it is necessary to reflect the status of a user or a terminal device on a presence server without requiring a client program installed on the terminal to update and notify presence information. Thus, in one aspect of the present invention, means for notifying the presence server of status information on the terminal is provided in a control server that manages a communication session between terminal devices. The control server is connected to a communication network to which the presence server is connected.

In another aspect of the present invention, a network comprises, as the network components, a communication line connecting at least two terminal devices, a plurality of servers provided somewhere on the communication line, and at least one presence server as defined by the architecture. A server other than the presence server detects a change in the terminal status information or presence information and notifies the presence server of the changed status information or presence information.

Other objects, features and advantages of the invention will become apparent from the following description of the embodiments of the invention taken in conjunction with the accompanying drawings.

BRIEF DESCRIPTION OF THE DRAWINGS

FIG. 12 is a diagram showing an example of the message format of a presence information update packet.

DESCRIPTION OF THE EMBODIMENTS

An embodiment of a system using presence information will be described below with reference to the drawings.

Figure 1:
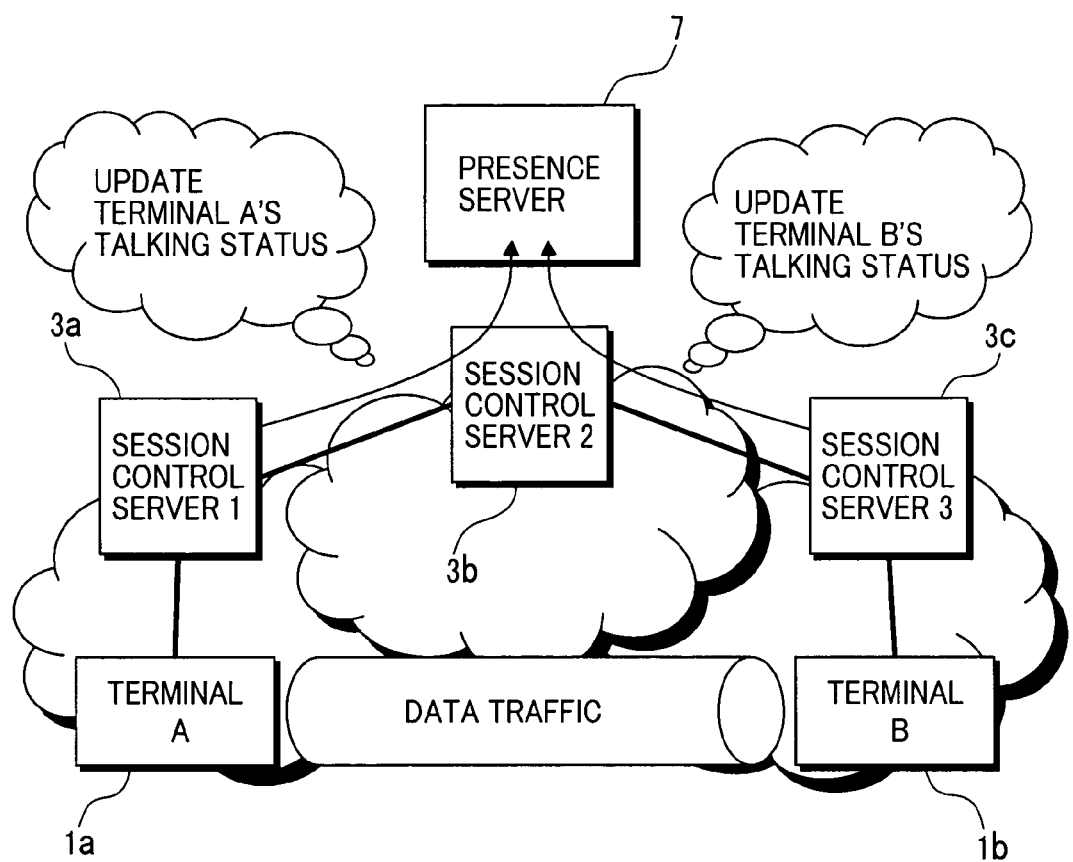
FIG. 1 is a configuration diagram of a system using presence information in an embodiment of the present invention.

FIG. 1 is a diagram showing an example of the configuration of a system using presence information in this embodiment. The system using presence information comprises a presence server 7 that manages presence information, which is status information on a user and a terminal 1 owned by the user, and notifies an update when the status is updated; session control servers 3 that relay presence information as well as session control information used to establish a communication session for sending and receiving audio and video data; and terminals 1 or applications used by users. "Data traffic" in FIG. 1 refers to a communication line connecting a terminal 1a and a terminal 1b. It may also be thought of as a connection formed on the Internet. The solid line extending from terminal A (1a) to terminal B (1b) via session control server 1 (3a), session control server 2 (3b), and session control server 3 (3c) is a control signal line through which the control signal that controls a session passes. There is no particular problem even if a communication route for the control signal is formed using the same physical communication line, or the same logical connection, as the data traffic described above.

In this embodiment, a "session" means a sequence of communication operations between terminals beginning with the communication start message and ending with the communication end message. "Status information" literally means information indicating the status of a terminal or a terminal user. For example, the status information is information indicating that the user is on-line or off-line. "Presence information" means, in a broad sense, attribute information on a terminal or a terminal user. For example, presence information is information broadly indicating the attribute such as birth date, address, and services to which the terminal subscribes. Therefore, in this embodiment, "presence information" is defined as a concept including "status information".

Figure 11:
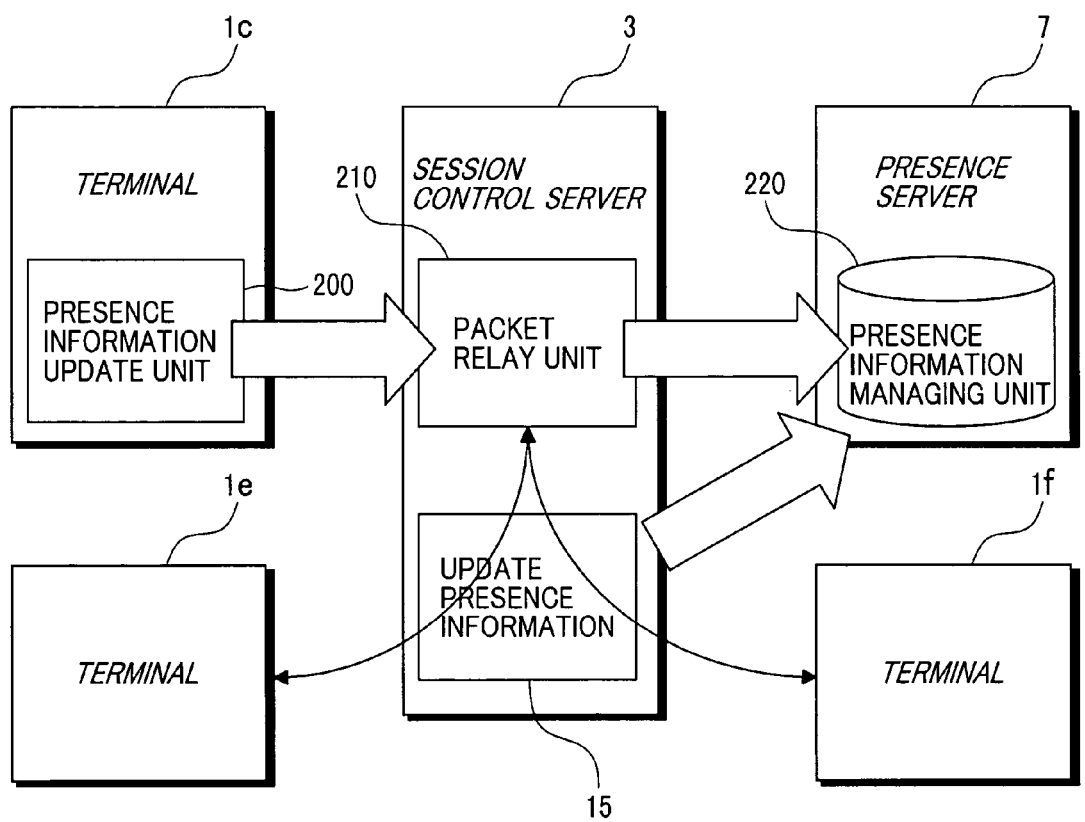
FIG. 11 is a diagram showing an example of a method used by the system using presence information according to the present invention.

FIG. 11 is a conceptual diagram of the network system in this embodiment. On behalf of a terminal 1e that has no presence information update function (for example, a conventional IP phone), the session control server 3 notifies the presence server 7 about status information on the terminal to allow other users to check the status of the user using the terminal that has no presence information update function. More specifically, the session control server 3 has a presence information update unit 15 and, when the status changes while a terminal session is monitored, the presence information update unit 15 sends a notification to the presence server 7.

This mechanism will be described in detailed below with reference to the block configuration diagram of the session control server 3 shown in FIG. 2. Conventionally, when sending and receiving audio or video data, the communication address or the coding system for sending and receiving audio or video data are transferred between terminals before sending and receiving the audio or video data. Usually, the former communication is called a session information communication and the latter communication is called a data information communication. The session control server 3 in this embodiment sends or receives packets especially for the session information communication that is the former communication.

The session control server 3 comprises a connection control unit 10 that receives and analyzes packets and reforms and sends header information required for the relay operation; a status management unit 11 that manages the status of each session; a terminal location management unit 12 that manages address information registered by the connected terminals; and the presence information update unit 15 that, when the status is updated, reforms the updated contents to a notification format and issues an instruction to send a status update notification to the presence server 7. The status management unit 11 has a second timer, and the terminal location management unit 12 has a first timer, each for measuring the current time of day (The reason will be described later). An IF 16 is a network interface via which packets are sent and received.

In response to a packet, the connection control unit 10 analyzes the contents of the packet and sends the content of the received message to the status management unit 11. When the content of the received message is a registration notification or a deletion notification from a connected terminal, the content of the received message is sent also to the terminal location management unit 12. The status management unit 11, which manages the status of each session, changes the status of the corresponding session based on the notified content. On the other hand, in response to a registration notification, the terminal location management unit 12 registers the notified address information and holds it for a specified period. In response to a deletion notification, the terminal location management unit 12 deletes the corresponding registration information even if the specified period has not yet expired. When it is desired to use a particular communication protocol such as SIP (Session Initiation Protocol), a protocol stack for SIP should be provided within the connection control unit to allow the server 3 to understand the SIP protocol.

The connection control unit 10 and the status management unit 11 are functional blocks required to implement the proxy server function of SIP (RFC 3261), and the terminal location management unit 12 is a functional block required to implement the location server function. In this embodiment, another functional block, the presence information update unit 15, is added to implement the object function of the present invention.

When a packet is received, the connection control unit 10 notifies the status management unit 11 that the packet is received. When the status changes to a particular status (for example, talking status, terminating status) as a result of notification, the connection control unit 10 sends a notification also to the presence information update unit 15. In this case, either the status management unit 11 or the connection control unit 10, which receives information on the changed status from the status management unit 11, may issue the notification to the presence information update unit 15. The content of the presence information update notification sent at this time is composed of updated status information and address information identifying a user or a terminal that has established the session.

In response to the presence information update notification, the presence information update unit 15 sends an inquiry to the terminal location management unit 12 to check if the user or the terminal that has established the session is connected to this server. As a search item specified for this inquiry, the address information identifying the user or the terminal included in the presence information update notification is used.

If it is found, as a result of the inquiry sent to the terminal location management unit 12, that the session has been established by a user or a terminal connected to the server, the presence information update unit 15 sends an instruction to the connection control unit 10 to request it to notify the presence server 7 that the status of the connected user or terminal has been updated to the status notified by the presence information update notification. In this case, the presence information update unit 15 specifies the notification content and the destination.

Upon receiving the instruction from the presence information update unit 15, the connection control unit 10 sends the content specified by the presence information update unit 15 to the specified destination. That is, the session control server 3 in this embodiment has a function to issue a new request message in addition to a function to relay a request message or a response message and a function to issue a response message that is issued in response to a request message.

Figure 2:
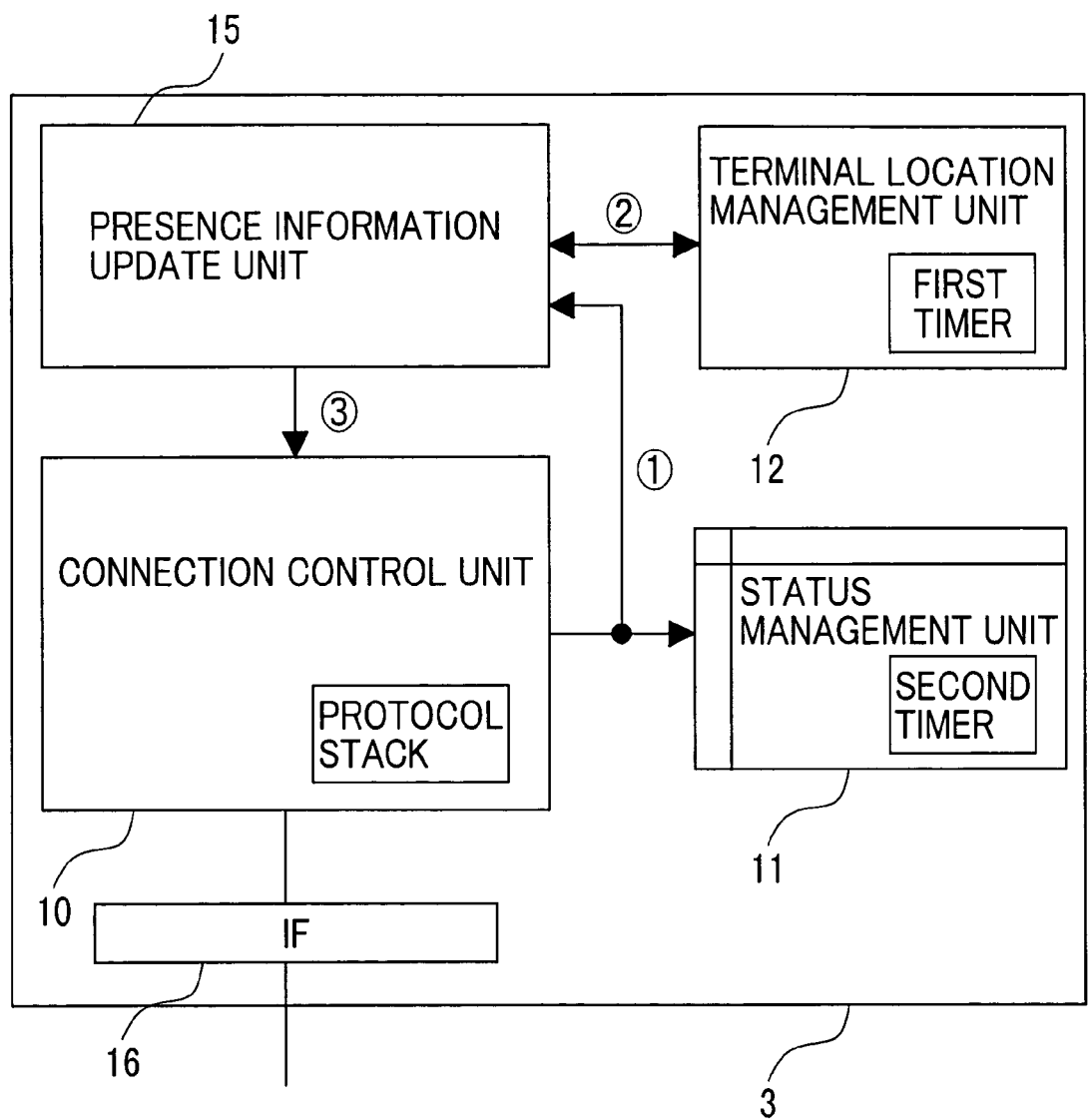
FIG. 2 is a block configuration of a session control server.

The control server shown in FIG. 2 has an external storage unit, not shown, in which the control program executing the control operation described above is stored. When the server is started, the control program is expanded in the memory provided in the cabinet for execution by the CPU. Although it is assumed in this embodiment that all functional blocks shown in FIG. 2 are implemented as software components, the configuration shown in FIG. 2 may also be implemented by hardware components using processors or signal processing circuits each corresponding a functional block.

Figure 3:
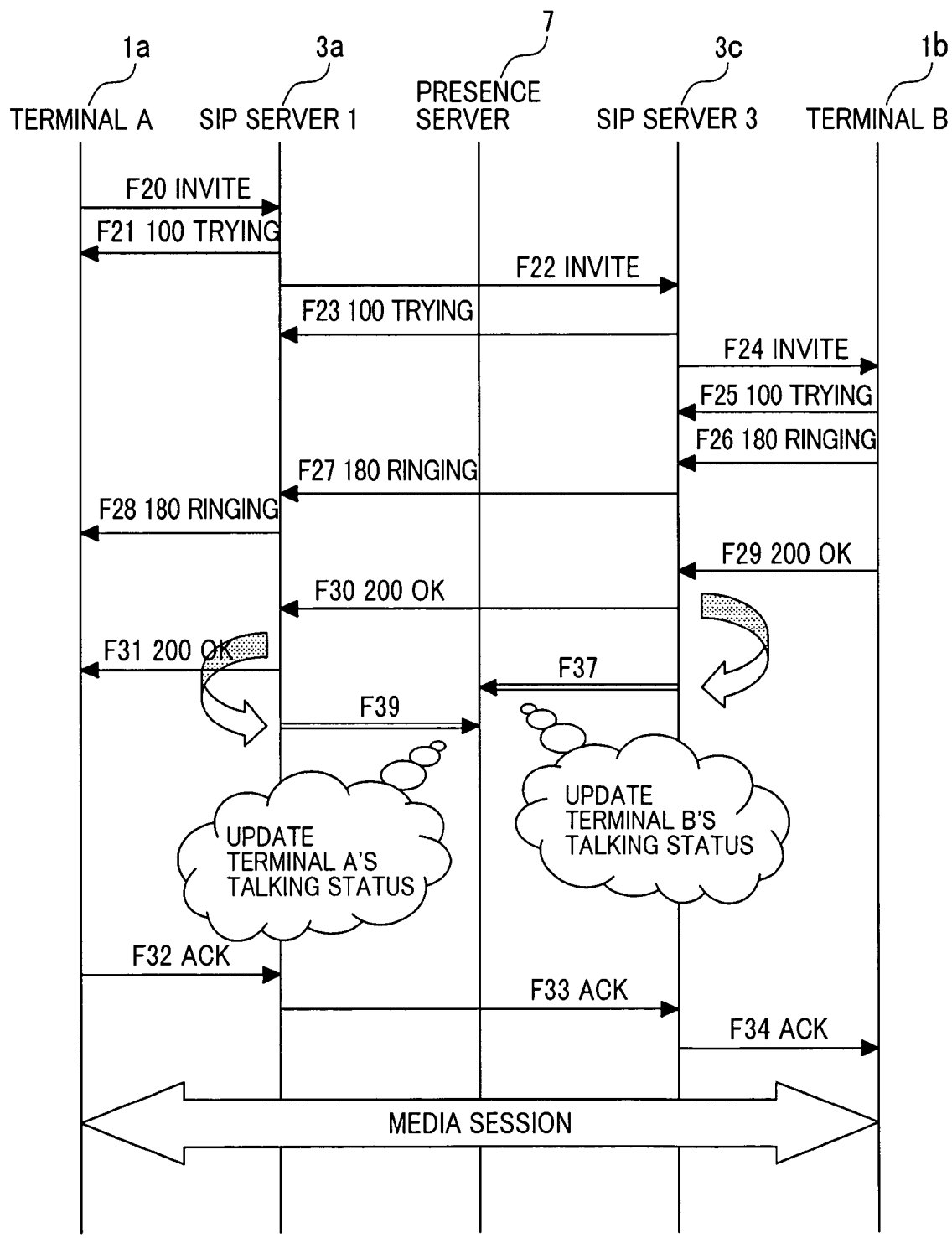
FIG. 3 is a sequence diagram showing an example of a talking status notification issuing procedure.

FIG. 3 is a sequence diagram showing an example of the talking status notification issuing procedure when SIP is used as the session control protocol. SIP uses the INVITE message to establish an audio or video communication session. In the INVITE session, adjustment is made between terminals in the flow indicated by a sequence of steps, F20-F34, shown in the figure and, based on the content notified by the INVITE request message or the 200 response message, audio data or video data is sent or received according to the RTP (Real-time Transport Protocol, RFC 1889).

The following describes an example in which, when a session using audio or video data is established and the session enters the talking status, the session control server 3 notifies the presence server 7 that the user terminal that has established the session has entered the talking status.

FIG. 3 is an example of a sequence in which the user terminal changes to the talking status when the 200 response message is received. This example shows a method in which the presence information update notification is issued to the presence information update unit 15 when the 200 response message is received in F29 and F30.

Figure 4:
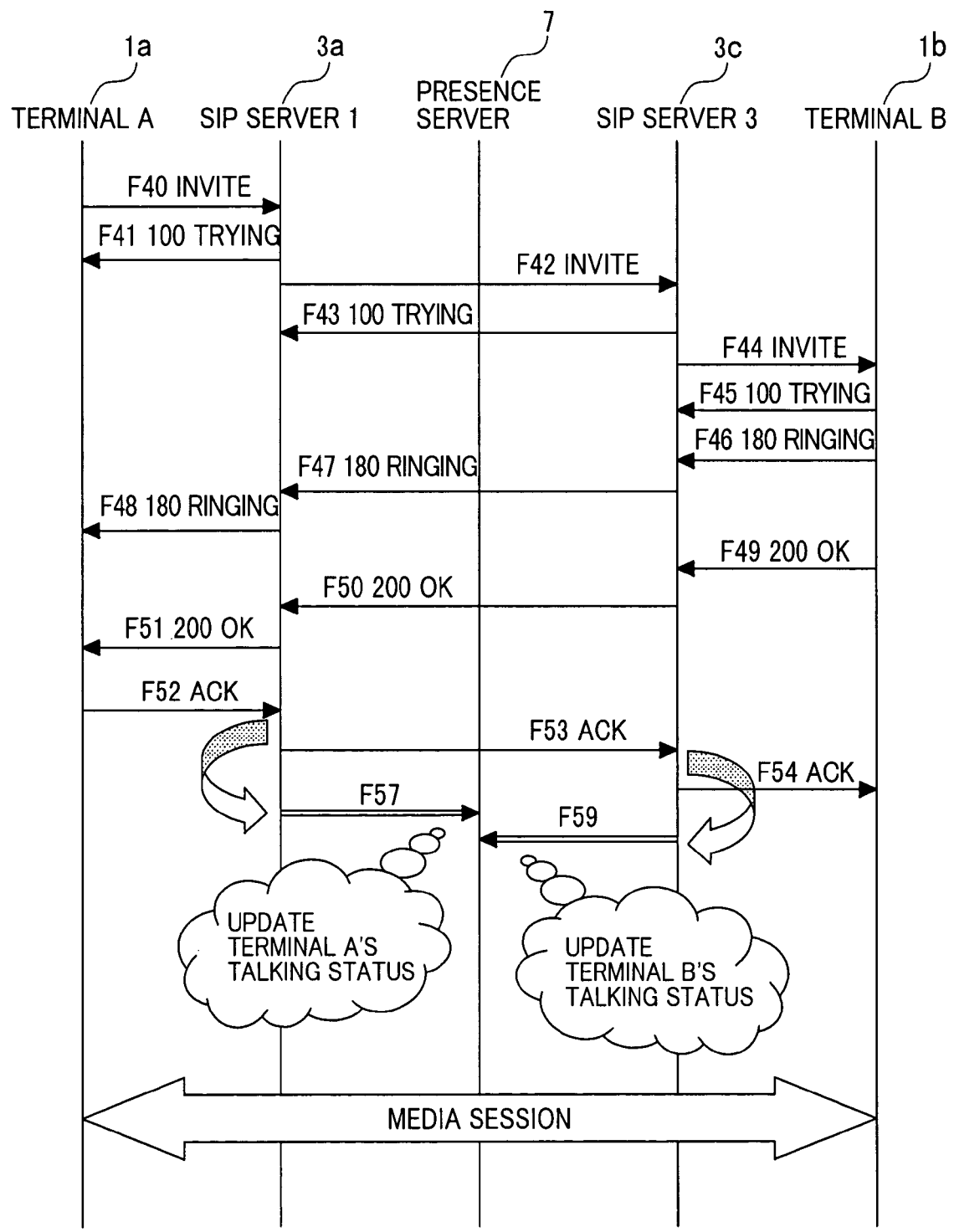
FIG. 4 is a sequence diagram showing another example of a talking status notification issuing procedure.

Similarly, FIG. 4 is a sequence diagram showing another example of the talking status notification issuing procedure when SIP is used. Steps F40-F54 are the same as F20-F34. This example shows a method in which the presence information update notification is issued to the presence information update unit 15 when the ACK message is received in F52 or F53.

When information required for data communication is notified by the INVITE request message and the 200 response message, either the method shown in FIG. 3 or the method shown in FIG. 4 may be used. However, when information required for data communication is notified by the 200 response message and the ACK message, the method shown in FIG. 4 must be used. The method shown in FIG. 4 has a merit in that the single method may be used both when information required for data communication is notified by the INVITE request message and the 200 response message and when information required for data communication is notified by the 200 response message and the ACK message. However, when information required for data communication is notified by the INVITE request message and the 200 response message, data communication is started in some cases without waiting for the transfer of the ACK message depending upon the terminal specifications. To properly reflect on the presence server the status of the terminal, which starts data communication without waiting for ACK as with the terminal designed according to the specifications described above, even when the ACK message is lost because the packet is lost, the method shown in FIG. 3 must be used only when information required for data communication is notified by the INVITE request message and the 200 response message.

Figure 5:
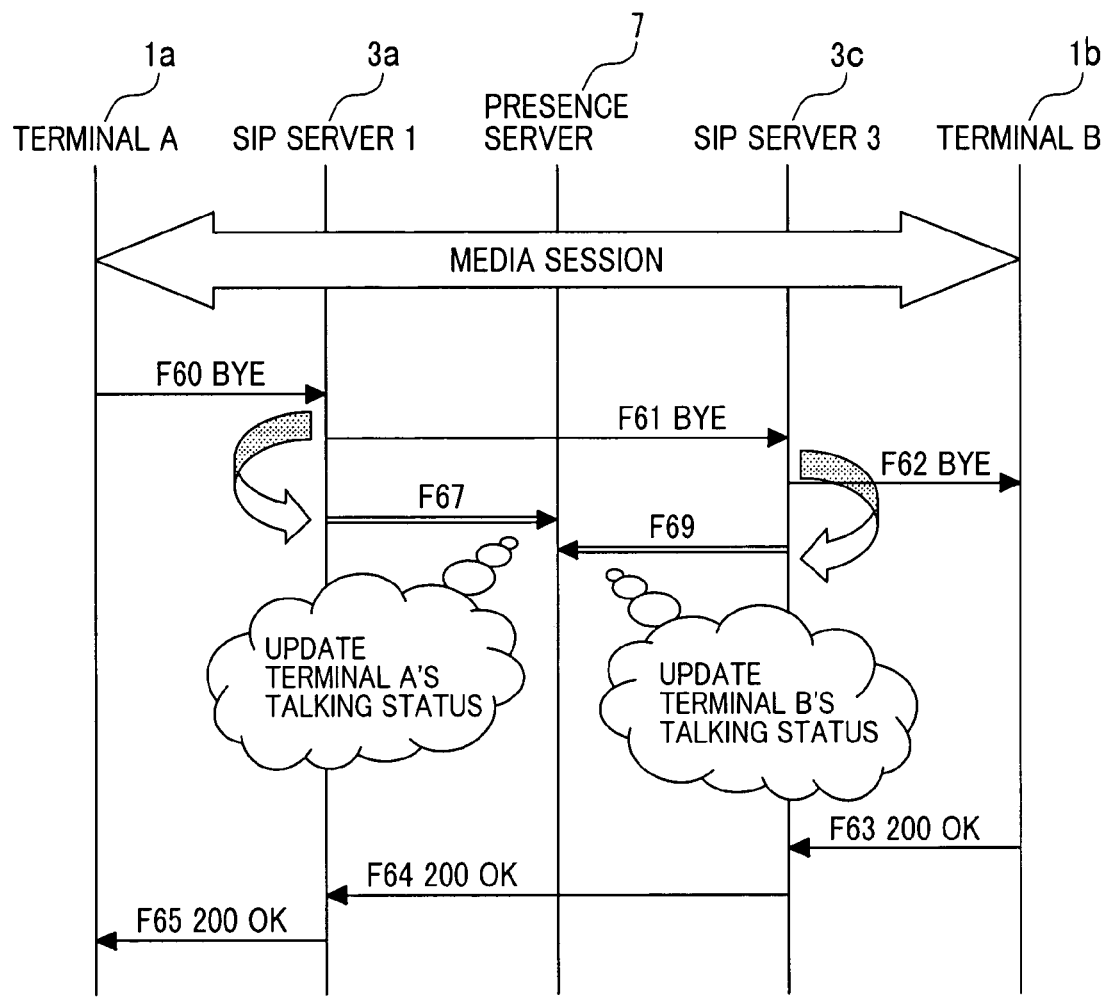
FIG. 5 is a sequence diagram showing an example of a terminating status notification issuing procedure.
Figure 6:
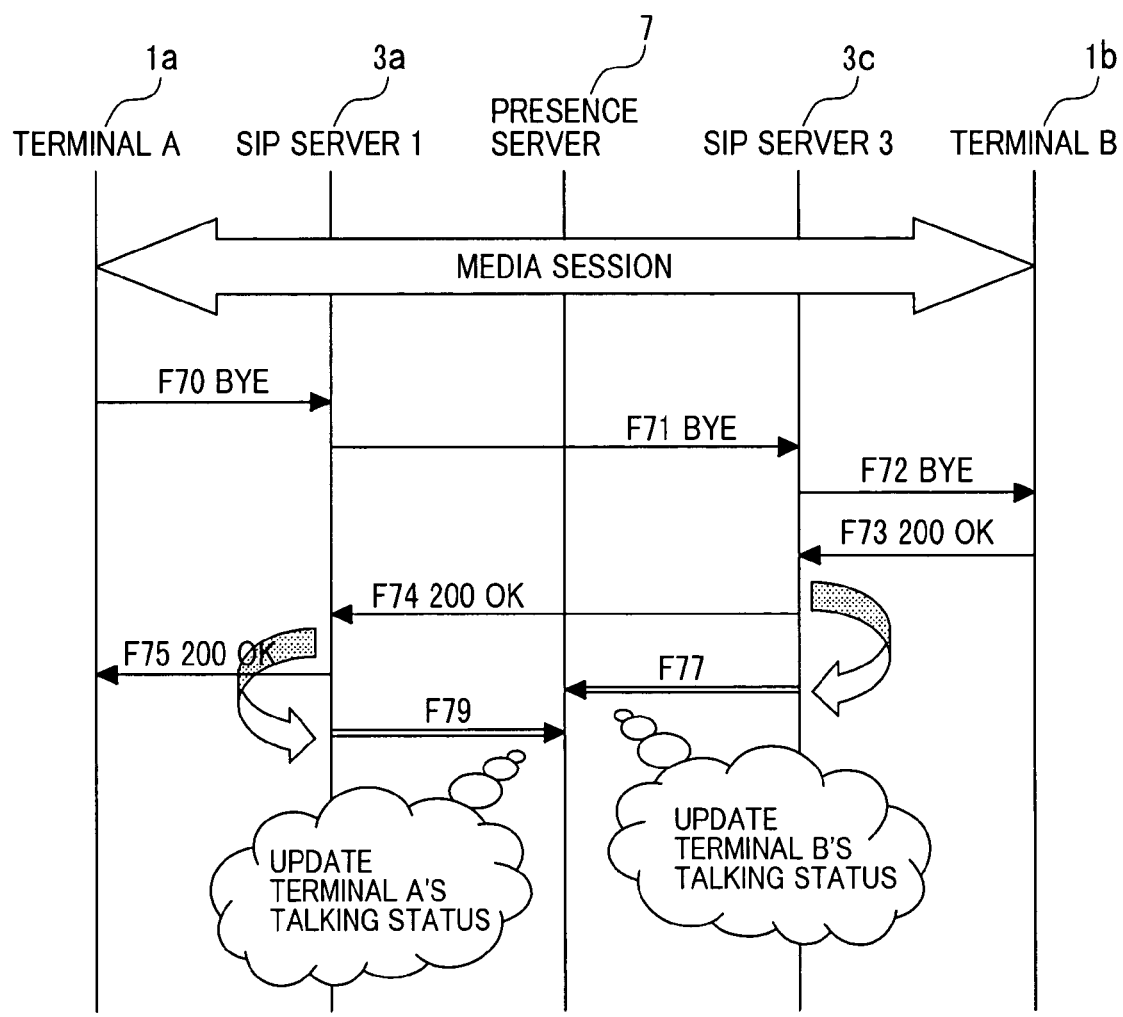
FIG. 6 is a sequence diagram showing another example of a terminating status notification issuing procedure.

FIG. 5 and FIG. 6 are sequence diagrams showing an example of the terminating status notification issuing procedure when SIP is used as the session control protocol. The BYE message is used to terminate the INVITE session and terminate data communication. FIG. 5 shows the method in which the presence information update notification is sent to the presence information update unit 15 when the BYE request is received to change the terminal to the terminating status. FIG. 6 shows the method in which the presence information update notification is sent to the presence information update unit 15 when the 200 response message is returned to the BYE request to change the terminal to the terminating status.

In the method shown in FIG. 5, the terminating status notification of the terminal 1a is sent from the session control server 3a, to which the terminal 1a is connected, to the presence server 7 when the BYE request is received in F60. The terminating status notification of the terminal 1b is sent from the session control server 3, to which the terminal 1b is connected, to the presence server 7 when the BYE request is received in F61.

On the other hand, in the method shown in FIG. 6, the terminating status notification of the terminal 1b is sent from the session control server 3c, to which the terminal 1b is connected, to the presence server 7 when the 200 response message is received in F73. The terminating status notification of the terminal 1a is sent from the session control server 3a, to which the terminal 1a is connected, to the presence server 7 when the 200 response message is received in F74.

The method shown in FIG. 5 has a merit when the terminal's specification defines that the terminal terminates data communication upon receiving the BYE message without waiting for the 200 response message to the BYE message to be received; the merit is that the status of the terminal can be reflected on the presence server properly even if the 200 response message is lost because the packet is lost. On the other hand, the method shown in FIG. 6 has a merit in that the status change is reflected on the presence server more accurately because the terminating status notification is sent when the session communication is completed.

The methods shown in FIG. 5 and FIG. 6 are that the status of the terminal is changed to the terminating status when a message is received. Another method is that the status of the terminal is changed when the expiration date/time specified by the request message expires. More specifically, the status of the terminal is changed to the terminating status when the expiration date/time of a session timer specified by the INVITE request message expires, or the status of the terminal is changed to the presence service usage terminating status when an expiration date/time specified by the SUBSCRIBE request expires. Such an expiration date/time is monitored, for example, by the status management unit 11 or the terminal location management unit 12. That is, the status management unit 11 or the terminal location management unit 12 comprises a timer that counts the current time of day and means for reading information on an expiration date/time specified by the message to monitor if the expiration date/time has passed.

Figure 7:
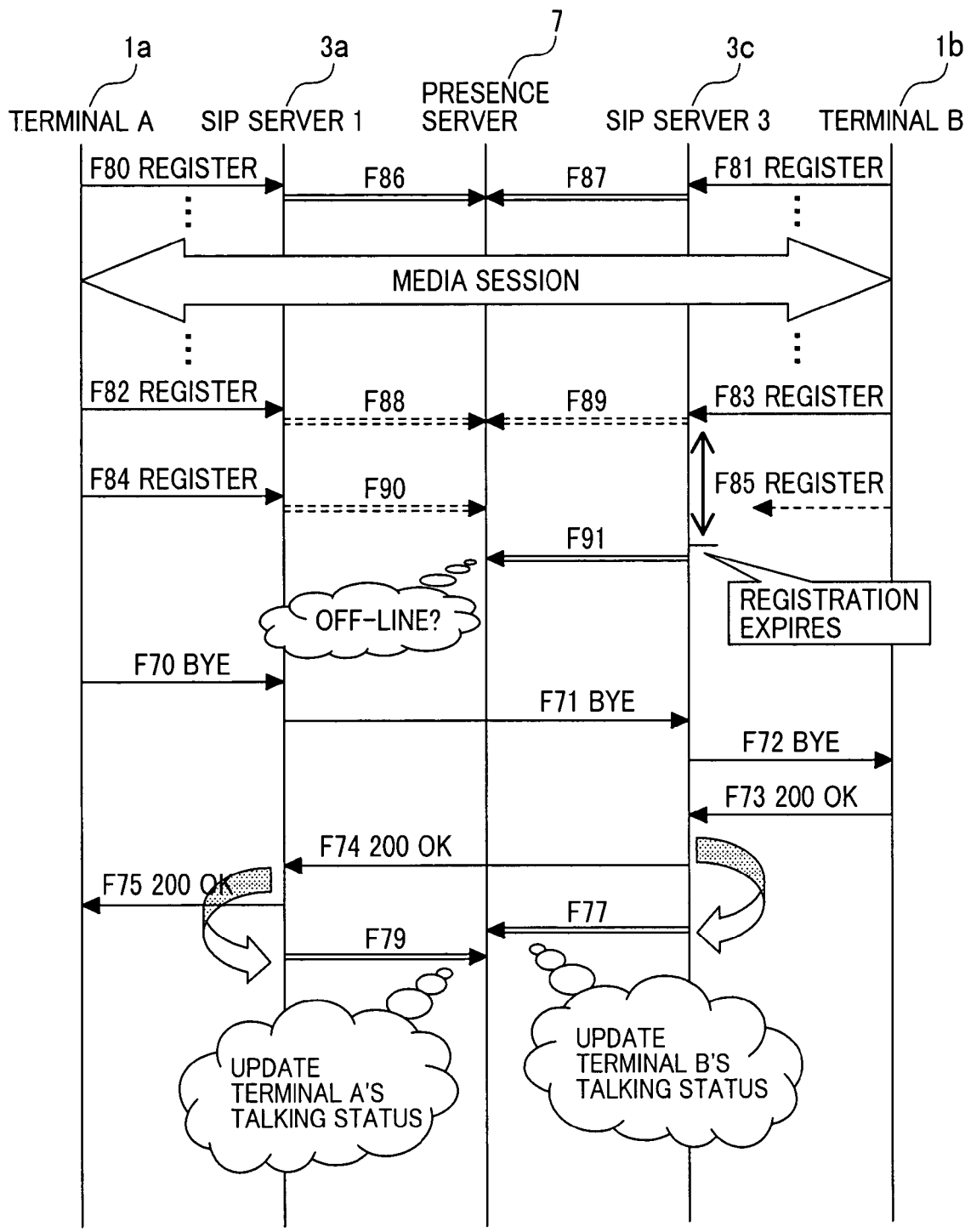
FIG. 7 is a sequence diagram showing an example of a semi-normal case.

FIG. 7 is a sequence diagram showing an example of a semi-normal case. The following also describes the method in which an online notification or an offline notification is issued as a terminal's status notification. In this method, when a REGISTER message requesting registration is issued as in F80 or F81, a presence information update notification is issued to the presence information update unit 15 to notify the presence server 7 that the terminal has gone on-line (F86, F87).

Because an expiration date/time is specified for a REGISTER message requesting registration, this expiration date/time may also be used to check if the terminal is alive. In this case, before the information registered in F80 or F81 expires, a REGISTER message requesting registration is re-issued as in F82 or F83 to update the expiration date/time. At this time, whether the notification is issued to the presence server 7 as in F88 or F89 depends also on the information content managed by the presence server 7. That is, when the presence server 7 also manages the expiration date/time, the notification in F88 or F89 is required; conversely, when the presence server 7 manages only whether the terminal is on-line and off-line but not the expiration date/time, the notification in F88 or F89 may be omitted. In the latter case, the session control server 3 determines that the notification is sent to the presence server 7 when information is newly registered and that no notification is sent when information is already registered and only the expiration ate/time is updated.

By contrast, an off-line notification is sent when a REGISTER message explicitly requesting registration deletion is issued from the terminal 1 or when the expiration date/time of registered information has expired. Although the status management unit 11 or the connection control unit 10 issues a notification to the presence information update unit 15 in FIG. 2 where the INVITE session is used as an example, the terminal location management unit 12 may also issue an on-line notification or an off-line notification issuance request to the presence information update unit 15.

The operations performed by the control server in the communication sequences in FIGS. 3-7 described above are implemented as a control program stored in an external storage unit connected to the server. Although the program algorithm depends on the sequences in FIGS. 3-7, the following steps are included in all sequences as common steps.
(1) Step for monitoring a communication session to detect a change in status information
(2) Step for generating a request message for updating status information when a change is detected
(3) Step for sending a generated update request message to the network interface For example, the step in which the SIP Server 1 (3a) in the sequence shown in FIG. 5 receives the BYE message from terminal A(a) in F60 corresponds to the step in which a change in the status information on terminal A is detected, and the step in which the message is sent to the presence server 7 in F67 corresponds to the step in which the request to update the status information is generated and is sent to the network interface. This step, which practically sends the message to the presence server 7, is equivalent, from the viewpoint of only the internal operation of the SIP server, to the operation that sends the generated message to the interface. The operation of the SIP Server 3 (3c) is the same as that of the SIP Server 1 (3a). Also, in the sequences in FIG. 3, FIG. 4, FIG. 6, and FIG. 7, the operation steps of each SIP server may be made correspond to steps (1), (2), and (3) described above.

When a talking/terminating notification and an on-line/off-line notification are processed independently in a presence information update notification sent from the session control server 3 to the presence server 7 as described above, the status information managed by the presence server 7 may become inconsistent in the situation described below.

For example, the status information may become inconsistent when a terminal goes out of wireless range if that terminal is used in a wireless environment such as a hot spot and is performing audio communication while regularly updating a REGISTER message requesting registration so that others can check if the terminal is alive. If the content registered by the REGISTER message expires while the terminal is out of wireless range, the session control server 3 sends an off-line notification to the presence server 7 as shown in F91 assuming that the registered content was not updated before the expiration date/time (A REGISTER message for updating the content did not arrive, F85). On the other hand, although no communication can be made while the terminal is out of wireless range, the talking status still continues unless the other user, who has given up communication because no sound is received, explicitly issues a termination instruction such as the one shown in F70 (As with the method of checking that a terminal is alive, a talking session may also require a regular notification and, if no session continuation notification is received, the session may be disconnected automatically. Even in this case, the talking status continues until a timeout occurs). If the terminal returns to the wireless range before a timeout occurs, it is possible that the communication is restored and the talking status virtually continues. In such a case, the status information may become inconsistent; for example, although the status managed by the presence server 7 is "off-line", the actual status is "talking".

To resolve the inconsistent status described above, the presence server 7 comprises presence information control means for controlling a status change based on a presence information update notification.

Figure 8:
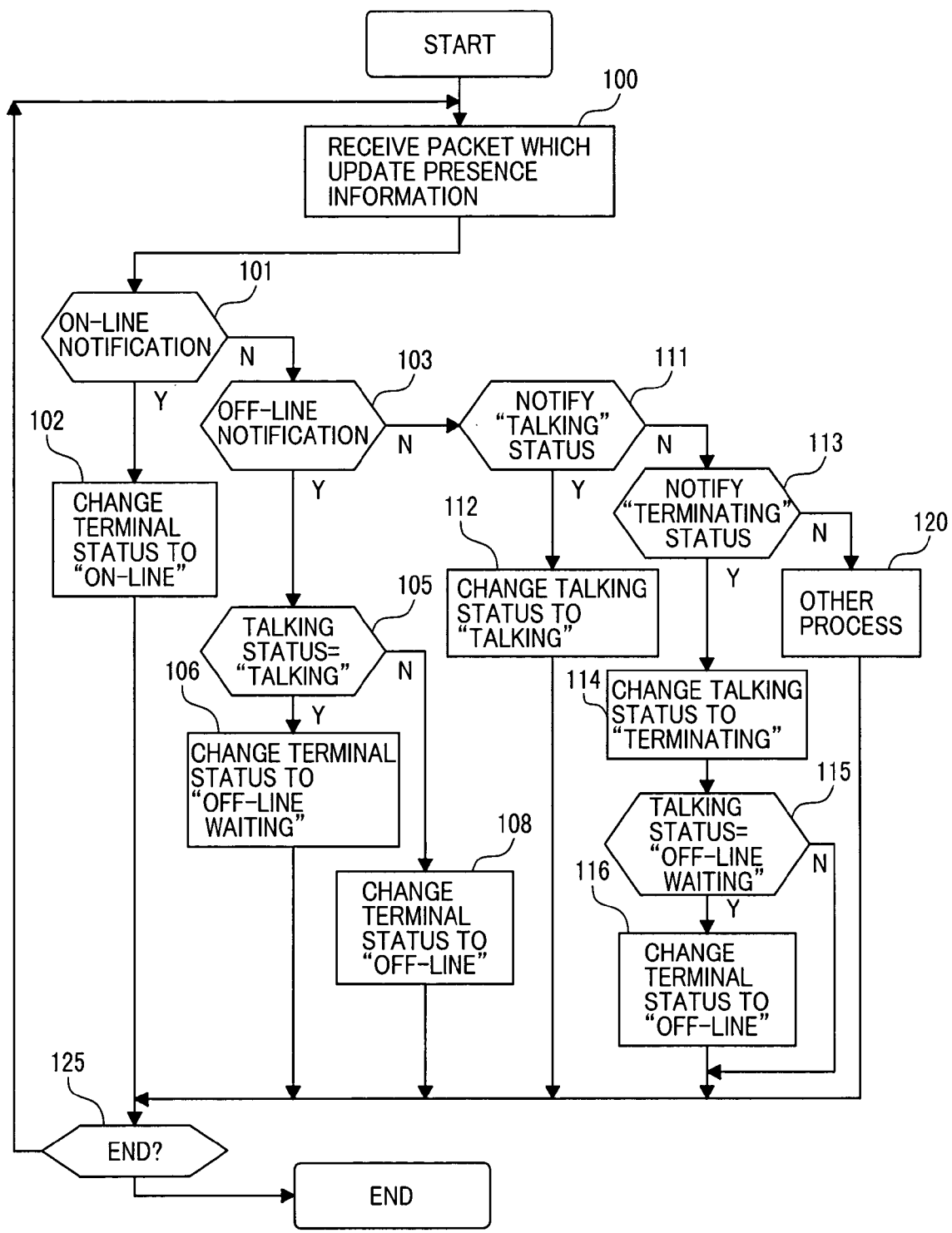
FIG. 8 is a flowchart showing a processing procedure of presence information control means.
Figure 9:
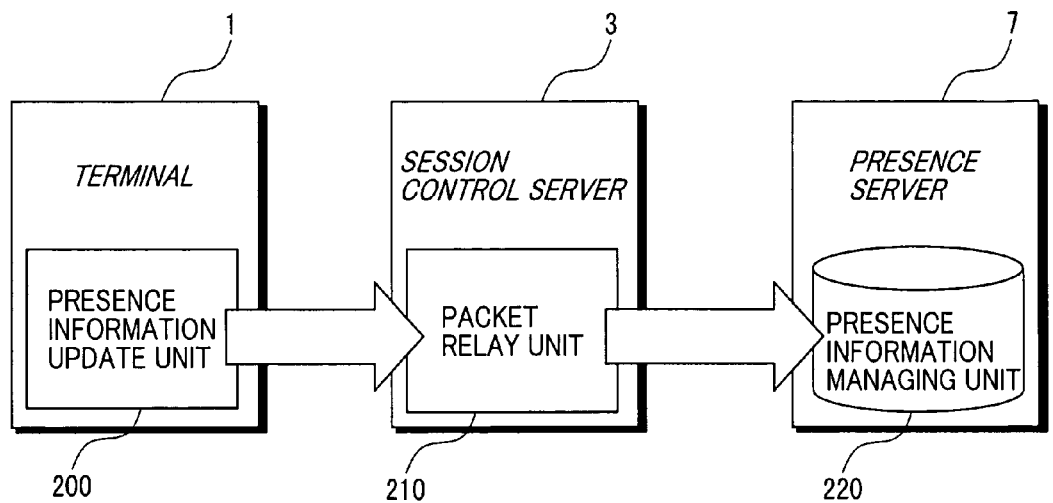
FIG. 9 is a diagram showing an example of a method used by a conventional system using presence information.
Figure 10:
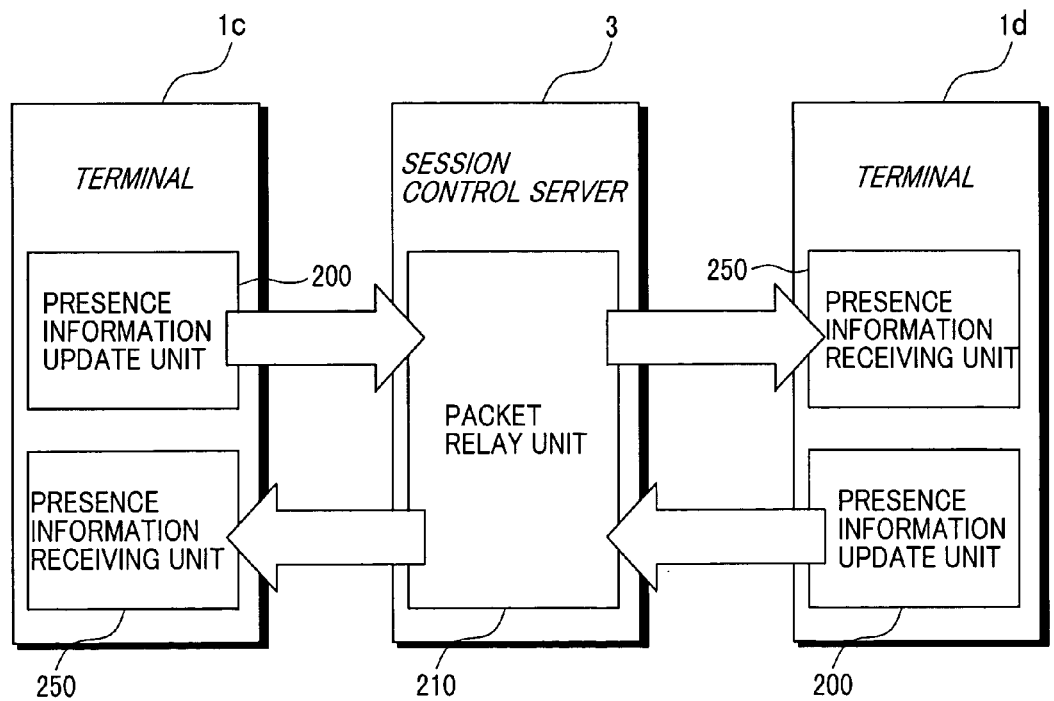
FIG. 10 is a diagram showing another example of a method used by a conventional system using presence information.

Next, with reference to FIG. 8, the presence information control means will be described.

In response to a packet containing a presence information update notification (step 100), the presence server 7 checks the content of the notification. If the notification content is an on-line notification (step 101), the means changes the value of presence information that manages the terminal status to "on-line" (step 102). If the content of the notification is an off-line notification (step 103), the means references presence information that manages the talking status and, if the status is "talking" (step 105), the means changes the terminal status to "off-line waiting" that is an intermediate status between the on-line status and the off-line status. On the other hand, if the result referenced in step 105 is not the talking status but the idle status, the means changes the terminal status to "off-line".

If the notification content of the presence information update notification is the talking status notification (step 111), the means changes the talking status to "talking" (step 112). There is no need to change the terminal status to "on-line" if an on-line notification is issued before a talking session starts, for example, at the same time the system is started, as shown in the example in FIG. 7 (F88, F89). However, if an on-line notification is not issued before a talking session, the means changes the terminal status to "on-line" during the processing of step 112.

If the notification content of the presence information update notification is a "terminating" status notification (step 114), the means changes the talking status to the "terminating" status. In addition, the means references the presence information that manages the terminal status and, if the status is "off-line waiting" (step 115), the means changes the terminal status to "off-line" (step 116). The presence server 7 performs status change control as described above to prevent an inconsistency in the presence status. To do so, the presence server 7 comprises means for detecting if there is a conflict between the presence information included in the presence information update packet and the presence information already stored in the presence server; and means for changing the already-stored presence information to resolve a conflict with the newly-received presence information. For example, when a notification for checking that a terminal is alive does not arrive due to some failures, the configuration described above prevents the information (on-line notification), which is notified by the session control server on behalf of the user or the terminal, from differing from the present information (talking) already stored in the present server.

Figure 13:
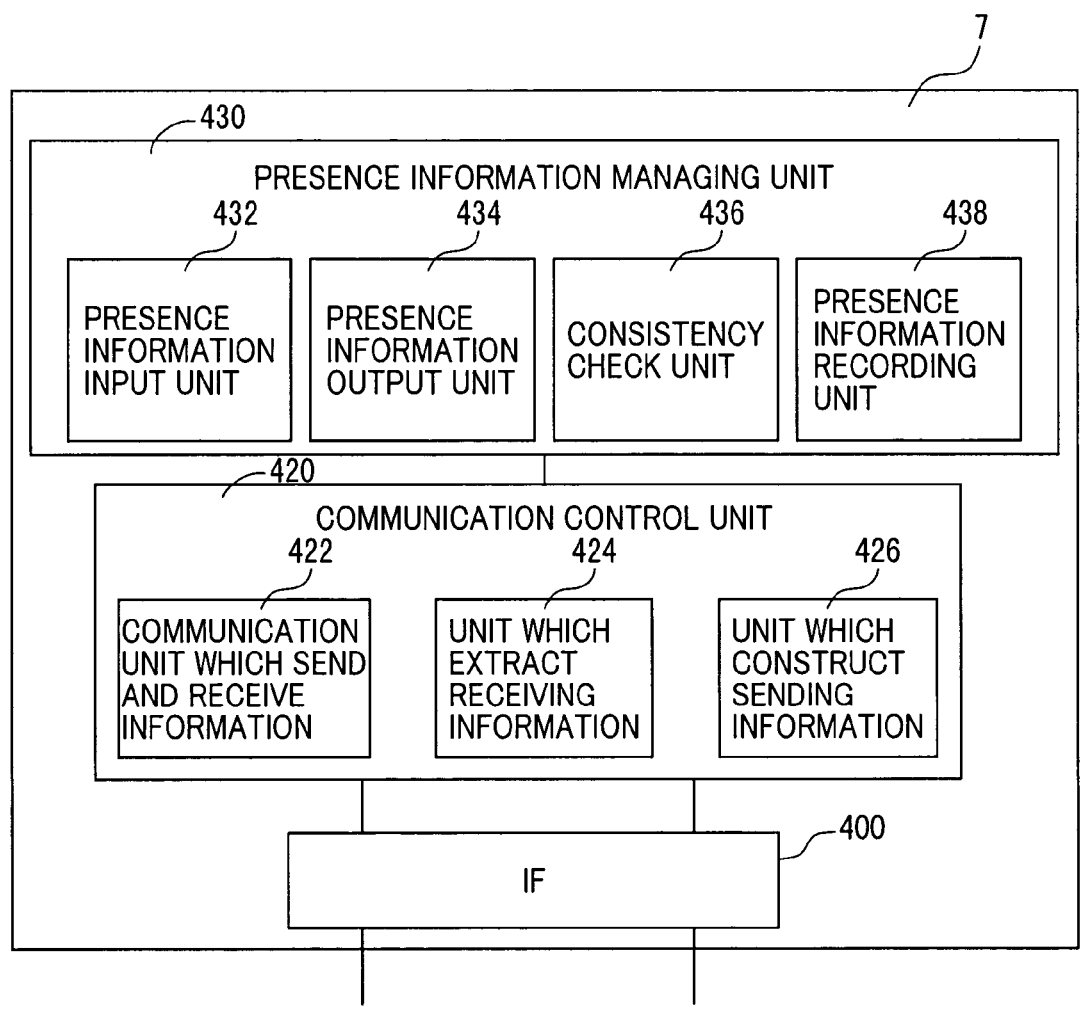
FIG. 13 is a functional block diagram of a presence server.

FIG. 13 shows a functional block diagram of the presence server that has the function to resolve an inconsistency in registered presence information. An IF 400 is a network interface that performs header processing, including that of the TCP/IP layer, for a received packet. The numeral 420 is a communication control unit that includes the protocol stack of a communication protocol. For example, to process an SIP packet, the communication control unit 420 includes the protocol stack of SIP. A communication unit that sends and receives information 422 is a block that sends and receives an SIP packet to or from the TCP or UDP layer of a received packet. A packet received via the IF 400 is transferred to a unit which extracts receiving information 424 for extracting information.

When the IF 400 receives a status information update request message from the session management server, the unit which extracts receiving information 424 extracts predetermined information from the received message and then transfers it to a presence information managing unit 430. The "predetermined information" is, for example, presence information on a terminal or a terminal user. The "presence information managing unit", a generic name of a group of blocks that manage presence information, is composed of a plurality of functional blocks that perform various types of management processing for presence information. Presence information extracted from the received packet is finally recorded on a presence information recording unit 438. The presence information recording unit 438 comprises, for example, storage means provided in the cabinet of the server (for example, HDD, memory, etc.) and a DB provided external to the cabinet of the server.

The presence information extracted by the unit which extracts receiving information 424 is sent to a consistency check unit 436. The consistency check unit 436 references the presence information recording unit 438 to check if the received presence information is consistent with the stored presence information. If they are consistent, the received presence information is input to a presence information input unit 432. If they are inconsistent, information that will replace the recorded presence information is generated and the generated information, as well as the received presence information, is input to the presence information input unit 432.

The presence information input unit 432 is a block that registers presence information with the presence information recording unit. A presence information output unit 434 is a block that gets presence information recorded on the presence information recording unit 438.

A unit which constructs sending information 426 is a functional block that reforms information, which will be sent, to the structure of a SIP packet. This unit may be thought of as a block that generates a packet to be actually sent. The generated sending packet is transferred to the communication unit which sends and receives information 422 and is sent to an external unit via the IF 400.

FIG. 12 is a diagram showing an example of the message format of a presence information update message in this embodiment. In this embodiment, the REGISTER message of SIP is used as a presence information update notification. A SIP message is composed of a start line 30, a header 310, an empty line 320, and a body 330. The body of a general REGISTER message in the message format shown in FIG. 12 is described in XML (eXtensible Markup Language). Although the body has no content in the figure, information is described in the body in this embodiment before the message is sent. In principle, status information may be included in the header to send a notification; however, there is a limit to the type of information that can be included in the header because of the SIP specification. For example, for status information not directly related to session control, status information that can be included in the header is limited to related information such as the handle name of a user, the type of terminal (phone/pc/PDA, etc.), the type of browser software used by the user, and so on.

On the other hand, the body can include a variety of information. Therefore, a broader variety of status information can be notified by including status information in the body than by including status information in the header information. Because the format type may also be specified in the header, many types of format can be used. A format other than XML shown in FIG. 12 can be used for description.

The information in the body can include not only status information but also various types of presence information. For example, information on a terminal that has established a session, such as the terminal address and the terminal type, as well as information on the detail of a session such as the coding method being used, can be included in the body for transmission as a presence information notification. The session type, such as streaming service or voice mail, may also be included in the presence information notification by checking the connection destination address. Instead of the REGISTER message, the PUBLISH message may also be used to do the same operation.

When the status changes, for example, when a talking session is established or terminated, the presence information update means in the session control server notifies the presence server of the changed status to reflect the status of a user or a client program on the information managed by the presence server, thus eliminating the user or the client program to intentionally update the presence information.

The presence information control means provided in the presence server controls consistency in the notified update information. Therefore, even when an on-line notification that is sent regularly is not received in the talking status, no inconsistency occurs in the status information.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A network system comprising
a session control server controlling a communication session created between at least two terminal devices; and
a presence server managing status information on one of said at least two terminal devices;
wherein said session control server comprises
means for detecting based on a session control message communicated between said at least two terminal devices, a change in status information on a user of said one of said at least two terminal devices or on said one of said at least two terminal devices; and
means for notifying said presence server of an update request for the status information when the change in the status information is detected.

2. The network system according to claim 1, wherein said presence server comprises
means for receiving the update request for the status information; and means for storing the status information; and means for updating said means for storing based on the update request.

3. The network system according to claim 2, wherein
said presence server further comprises means for comparing the notified status information with some other status information on the terminal device or a user of the terminal device, to which the status information belongs, for checking consistency of the update request with the other status information.

4. The network system according to claim 3, wherein said presence server rewrites the other status information so that, when the other status information is not consistent with the status information specified by the update request, the other status information becomes consistent with the status information specified by the update request.

5. The network system according to claim 1, wherein SIP (Session Initiation Protocol) is used.

6. The network system according to claim 1, wherein
said means for notifying said presence server generates information of the update request for the status information when the change in the status information is detected.

7. The network system according to claim 1, wherein
said means for notifying said presence server generates information of the update request for the status information when the change in the status information is detected, by reflecting the change in the status information.

8. The network system according to claim 1, wherein
said means for notifying said presence server generates information of the update request for the status information by reflecting session status of a plurality of clients.

9. A network system comprising
a session control server transferring, from a first terminal device to a second terminal device, a packet including a session control message for controlling a communication session created between at least two terminal devices including the first and second terminal devices;
a presence server managing status information on one of said at least two terminal devices;
said session control server comprises
means for detecting, based on the session control message transferred between the first and second terminal devices, a change in status information on a user of at least one of said first and second terminal devices; and
means for notifying said presence server of an update request for the status information when the change in the status information is detected.

10. The network system according to claim 9, wherein
said means for notifying said second server generates information of the update request for the status information when the change in the status information is detected.

11. The network system according to claim 9, wherein
said means for notifying said second server generates information of the update request for the status information when the change in the status information is detected, by reflecting the change in the status information.

12. The network system according to claim 9, wherein
said means for notifying said second server generates information of the update request for the status information by reflecting session status of a plurality of clients.

13. A server connected via a network to a presence server managing status information on a user of a first terminal device and on the first terminal device, said server comprising:
a communication control unit that reforms header parameters, of a received packet from a second terminal device and transfers the received packet, whose header parameters have been reformed, to said first terminal device, the received packet including a session control message being transferred between the first terminal device and the second terminal device;
a status management unit that manages the status of a communication session created between the first and second terminal devices on a certain expiration time basis;
a terminal location management unit that manages address information on the first terminal device;
means for detecting a change in information on the status of the communication session based on the session control message included in the received packet and being transferred between the first and second terminal devices; and
a presence information update unit that generates a presence information update message, which informs said presence server that the status information or the address information has changed, when the change is detected and issues an instruction to send the presence information update message to said communication control unit.

14. The network system according to claim 13, wherein
information of the update request for the status information is generated when the change in the status information is detected.

15. The network system according to claim 13, wherein
information of the update request for the status information is generated when the change in the status information is detected, by reflecting the change in the status information.

16. The network system according to claim 13, wherein
information of the update request for the status information is generated by reflecting session status of a plurality of clients.

17. A server connected via a network to a presence server managing status information on a user of a terminal device or on the terminal device, said server comprising:
a communication control unit that reforms header parameters, of a received packet from a second terminal device and transfers the received packet, whose header parameters have been reformed, to said first terminal device;
a status management unit that manages the status of a communication session created between the first and second terminal devices on a certain expiration time basis;
a terminal location management unit that manages address information on the first terminal device;
means for detecting a change in information on the status of the communication session based on a session control message communicated between the first and second terminal devices; and
a presence information update unit that generates a presence information update message, which informs said presence server that the status information or the address information has changed, when the change is detected and issues an instruction to send the presence information update message to said communication control unit.

18. The server according to claim 17 wherein
said means for detecting a change in information on the status of the communication session is further implemented to detect a change in the address information receiving, from the terminal device, a location registration request message.

19. The server according to claim 18 wherein said presence information update unit comprises means for checking if a terminal device belonging to the status information is a terminal device managed by said server and, only when the status information in which the change was detected belongs to a terminal managed by said server, generates the presence information update message.

20. The server according to claim 19 wherein said means for checking if a terminal device belonging to the status information is a terminal device managed by said server compares the domain name of the address of the server with the domain name of the address of the terminal device and, when the domain names match, determines that the terminal is to be managed by the server.

21. The server according to claim 17 wherein said communication control unit has a protocol stack for use by SIP (Session Initiation Protocol) and said presence information update unit assumes a moment, at which a 200 response message is received in response to an INVITE request message, as a time to change to a talking status and issues an instruction to send the presence information update message.

22. The server according to claim 17 wherein said communication control unit has a protocol stack for use by SIP (Session Initiation Protocol) and said presence information update unit assumes a moment, at which an ACK message is received after a 200 response message is received in response to an INVITE request message, as a time to change to a talking status and issues an instruction to send the presence information update message.

23. The server according to claim 17 wherein said communication control unit has a protocol stack for use by SIP (Session Initiation Protocol) and said presence information update unit assumes a moment, at which a BYE request is received, as a time to change to a terminating status and issues an instruction to send the presence information update message.

24. The server according to claim 17 wherein said communication control unit has a protocol stack for use by SIP (Session Initiation Protocol) and said presence information update unit assumes a moment, at which a 200 response message is received in response to a BYE request, as a time to change to a terminating status and issues an instruction to send the presence information update message.

25. The server according to claim 17 wherein said communication control unit has a protocol stack for use by SIP (Session Initiation Protocol) and said presence information update unit assumes a moment, at which a registration is made by a REGISTER message, as a time to change to an on-line status and issues an instruction to send the presence information update message.

26. The server according to claim 17 wherein said communication control unit has a protocol stack for use by SIP (Session Initiation Protocol) and said presence information update unit assumes a moment, at which a registration is deleted by a REGISTER message, as a time to change to an off-line status and issues an instruction to send the presence information update message.

27. The server according to claim 17, further comprising: means for reading information on an expiration date of the session specified by a control message issued in the communication session; and
means for comparing the message that has been read with the current time of day,
wherein said presence information update unit assumes a time, at which the current time of day has passed the expiration time, as a time to change the status of the communication session and issues an instruction to send the presence information update message.

28. The server according to claim 27 wherein said terminal location management unit has a timer to count the time of day, and
said presence information update unit assumes a time, at which the expiration time has expired, as a time to change the status to an off-line status and issues an instruction to send the presence information update message.

29. The server according to claim 17, further comprising: means for generating a PUBLISH message or REGISTER message including in a body thereof the status information or the address information,
wherein the PUBLISH message or REGISTER message is sent to said presence server as the presence information update message.

30. The server according to claim 29 wherein the body of the PUBLISH message or REGISTER message includes one of the following information: session type, information on the terminal device that has established the session, and information on a coding system and a communication speed used by the established session.

31. The server according to claim 17 wherein said communication control unit has a function to send a new request message.

32. The server according to claim 17, wherein said presence information update unit generates information of the update request for the status information when the change in the status information is detected.

33. The server according to claim 17, wherein said presence information update unit generates information of the update request for the status information when the change in the status information is detected, by reflecting the change in the status information.

34. The network system according to claim 17, wherein said presence information update unit generates information of the update request for the status information by reflecting session status of a plurality of clients.

35. A presence server, connected via a network to a session control server managing a communication session created between at least two terminal devices, for managing status information on said communication session, said presence server comprising:
an interface receiving a status information update message received from said session control server if the session control server detects a change in the communication session based on a session control message communicated between the at least two terminal devices;
storage means for storing a plurality of status information pieces;
means for changing a content stored in said storage means; and
means for judging whether there is an inconsistency between the status information included in the update message (first status information) and other status information (second status information) stored in said storage means and belonging to a terminal to which the first status information belongs, wherein, if there is an inconsistency between the first status information and the second status information, the second status information is made to match the first status information.

36. A communication control method for use in communication using one or more servers, each having a function to manage a communication session created between terminal devices, and a presence server in which status information describing the status of the terminal devices or the status of a terminal user is stored, said method comprising the steps of:

starting the communication session using SIP (Session Initiation Protocol);

detecting a change in the status information based on a session control message communicated between the terminal devices; and notifying, by one of the one or more servers other than said presence server, the change in the status information to said presence server upon detecting the change.

37. The communication control method according to claim 36, wherein a session control server with a function to manage the communication session is used as one of said one or more server.

38. The communication control method according to claim 36, wherein said notification is made by sending a PUBLISH message or REGISTER message, whose body includes the status information or address information on said terminal device, to the presence server.

39. The communication control method according to claim 38, wherein the body of the PUBLISH message or REGISTER message includes one of the following information:

session type, information on the terminal device that has established the session, and information on a coding system and a communication speed used by the established session.

40. The communication control method according to claim 36, wherein the step of notifying, by one of the one or more servers other than said presence server, the change in the status information to said presence server when the change is detected further comprises the step of generating information of the update request for the status information when the change in the status information is detected.

41. The communication control method according to claim 36, wherein the step of notifying, by one of the one or more servers other than said presence server, the change in the status information to said presence server when the change is detected further comprises the step of generating information of the update request for the status information when the change in the status information is detected, by reflecting the change in the status information.

42. The communication control method according to claim 36, wherein the step of notifying, by one of the one or more servers other than said presence server, the change in the status information to said presence server when the change is detected further comprises the step of generating information of the update request for the status information by reflecting session status of a plurality of clients.

43. A server control method for use by a server that has a control function, said server being in communication with a presence server in which status information describing the status of a terminal device or a terminal device user is stored, said control function controlling a communication session created between at least two terminal devices, said server control method comprising the steps of:

managing the communication session to detect a change in the status information based on a session control message communicated between the at least two terminal devices;

generating an update request message about the status information when the change is detected; and sending the update request message to said presence server.

44. The server control method according to claim 43, further comprising the step of generating information of the update request for the status information when the change in the status information is detected.

45. The server control method according to claim 43, further comprising the step of generating information of the update request for the status information when the change in the status information is detected, by reflecting the change in the status information.

46. The server control method according to claim 43, further comprising the step of generating information of the update request for the status information by reflecting session status of a plurality of clients.

47. A non-transitory computer readable recording medium for recording a control program for use by a server that has a control function, said server being in communication with a presence server in which status information describing the status of a terminal device or a terminal device user is stored, said control function controlling a communication session via SIP (Session Initiation Protocol) created between at least two terminal devices, said control program executing the steps of:

managing the communication session to detect a change in the status information based on a session control message communicated between the at least two terminal devices;

generating an update request message about the status information when the change is detected; and sending the update request message to said presence server.

48. The non-transitory computer readable recording medium according to claim 47 wherein the step of generating an update request message about the status information includes the step of:

generating a PUBLISH message or REGISTER message whose body includes the status information and address on the terminal device.

49. The non-transitory computer readable recording medium according to claim 48, comprising the step of generating the PUBLISH message or REGISTER message whose body includes the following information: session type, information on the terminal device that has established the session, and information on a coding system and a communication speed used by the established session.

* * * * *